(12) United States Patent
Zumberge et al.

(10) Patent No.: US 9,250,118 B2
(45) Date of Patent: Feb. 2, 2016

(54) LEAF-SPRING OPTICAL SEISMOMETER USING FRINGE SIGNALS FOR SEISMIC MEASUREMENTS

(75) Inventors: Mark A. Zumberge, San Diego, CA (US); Jonathan Berger, San Diego, CA (US); Erhard Wielandt, Kirchheim (DE)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 751 days.

(21) Appl. No.: 13/437,901

(22) Filed: Apr. 2, 2012

(65) Prior Publication Data

US 2012/0247213 A1    Oct. 4, 2012

Related U.S. Application Data

(60) Provisional application No. 61/470,462, filed on Mar. 31, 2011.

(51) Int. Cl.
*G01H 9/00*    (2006.01)

(52) U.S. Cl.
CPC ...................... *G01H 9/00* (2013.01)

(58) Field of Classification Search
CPC ........... G01C 15/002; G01H 9/00; G01V 1/00
See application file for complete search history.

(56) References Cited

U.S. PATENT DOCUMENTS

| | | | |
|---|---|---|---|
| 5,289,434 A * | 2/1994 | Berni | ........................... 367/178 |
| 5,450,196 A | 9/1995 | Turner | |
| 7,224,463 B1 | 5/2007 | Zumberge et al. | |
| 8,023,116 B1 | 9/2011 | Zumberge et al. | |
| 2002/0064233 A1 | 5/2002 | Terreault et al. | |
| 2005/0027489 A1 | 2/2005 | Kasevich et al. | |

OTHER PUBLICATIONS

Berger, et al., "Ambient Earth Noise: A Survey of The Global Seismographic Network," J. Geophys. Res. 109:B11307, 2004.
Bush, et al., "Multi-Channel Interferometric Demodulator," SPIE Third Pacific Northwest Fiber Optic Sensor Workshop, 3180, 11 pages, May 1997.
Davis, et al., "Fiber Optic Displacement Sensor," SPIE Fourth Pacific Northwest Fiber Optic Sensor Workshop, 5 pages, May 1998.
Eom, et al., "The Dynamic Compensation of Nonlinearity in a Homodyne Laser Interferometer," Meas. Sci. Technol., 12:1734-1738, 2001.
Fels, et al., "Parametric Analysis and Calibration of the STS-1 Seismometer of the IRIS/IDA Seismographic Network," Bull Seismo/. Soc. Am, 84(5):1580-1592, 1994.

(Continued)

*Primary Examiner* — Hwa Lee
(74) *Attorney, Agent, or Firm* — Perkins Coie LLP

(57) ABSTRACT

Methods, structures, devices and systems are disclosed for implementing optical seismometers that detect seismic information based on optical interferometry. In one aspect, a device includes a first retroreflector attached to a mass of a seismometer, a second retroreflector attached to a member of a frame of the seismometer, the frame structured to suspend the mass, and optical components attached to the member of the frame and configured with the first and second retroreflectors to form an interferometer, in which a change in position of the mass is identified by detecting by a change in an optical path of a light beam generated by a light energy source transmitted to the interferometer.

14 Claims, 9 Drawing Sheets

(56) References Cited

OTHER PUBLICATIONS

Heydemann, Peter L.M., "Determination and Correction of Quadrature Fringe Measurement Errors in Interferometers," Applied Optics, 20(19):3382-3384, 1981.

Holcomb, et al., "Evaluaton of Installation Methods for STS I Seismometers," U.S. Geol. Surv. Open-File Rept., 92-302, 1992.

Wielandt, et al., "The Leaf-Spring Seismometer: Design and Performance," Bull. Seismo/. Soc. Am., 72 (6):2349-2367, 1982.

Zumberge, et al., "An Optical Fiber Infrasound Sensor: A New Lower Limit on Atmospheric Pressure Noise Between 1 and 10 Hz," The Journal of the Acoustical Society of America, 113(5):2474-2479, May 2003.

Zumberge, et al., "Resolving Quadrature Fringes in Real Time," Appl. Optics, 43(4):771-775, 2004.

* cited by examiner

LEAF-SPRING OPTICAL SEISMOMETER USING FRINGE SIGNALS FOR SEISMIC MEASUREMENTS

CROSS REFERENCE TO RELATED APPLICATIONS

This patent document claims the priority of U.S. Provisional Patent Application No. 61/470,462 entitled "OPTICAL SEISMOMETER" filed on Mar. 31, 2011, which is incorporated by reference as part of this document.

STATEMENT REGARDING FEDERALLY SPONSORED RESEARCH OR DEVELOPMENT

This invention was made with government support under grant no. EAR0732418 awarded by the National Science Foundation and grant no. G10AC00541 awarded by the U.S. Geological Survey. The government has certain rights in the invention.

TECHNICAL FIELD

This patent document relates to seismometer technologies.

BACKGROUND

Seismometers are devices which can pick up energy transmissions (e.g., vibrations) in the earth, e.g., on the ground or in water such as oceans, lakes and rivers. The seismic signals detected by seismometers can be analyzed to provide understanding of the surrounding earth compositions for various applications, including oil and gas explorations and mining. Vibration waves travel at different velocities depending upon the materials through which they travel, and analysis of these variations at different depths and locations can yield information about what the composition of the surround material is made of. For example, seismometry techniques can be used in oil and gas exploration, e.g., to assess if oil and gas pockets exist in the proximity of drilling operations and, using information from the assessment, to implement changes in the drilling strategy to best tap the resource.

SUMMARY

Techniques, systems, and devices are disclosed for implementing optical seismometers that provide seismic sensing based on optical sensing.

In one aspect of the disclosed technology, a seismometer based optical sensing includes a seismometer frame, a mass of a seismometer suspended to the seismometer frame and responsive to vibrations to move relative to the seismometer frame, a first optical retroreflector attached to and fixed in position relative to the mass, a second optical retroreflector attached to and fixed in position relative to the seismometer frame, optical components attached to the seismometer frame and configured with the first and second optical retroreflectors to form an optical interferometer, a first optical detector that detects a first optical output of the optical interferometer, a second optical detector that detects a second optical output of the optical interferometer, and a processing unit that processes the detector outputs from the first and second optical detectors to extract seismic information indicated by the motion of the mass of the seismometer.

In another aspect, an optical seismometer includes a seismometer frame, a spring engaged to the seismometer frame, a mass that is engaged to the spring to suspend relative to the frame and is free to move with one degree of freedom relative to the frame, and an optical transducer that determines a displacement of the mass using an interferometer including a beam splitter that splits a laser beam into a first beam to the mass and a second beam, a first retroreflector attached to the mass to reflect the first beam back to the beam splitter, and a second retroreflector attached to the frame to reflect the second beam back to the beam splitter to overlap with the first beam reflected back by the first retroreflector to produce an optical interference signal indicating a motion of the mass.

In another aspect, a method for measuring seismometry data based on optical sensing includes transmitting a light beam from a light energy source into two optical paths in an interferometer incorporated into a seismometer including a mass that is free to move based on seismic movements, in which the movement of the mass affects at least one of the two optical paths to produce an optical interference signal that indicates the movement of the mass, using two photodetectors to detect two interference fringe signals from the interferometer that represent sine and cosine values of the optical interference in the interferometer, and processing the fringe signals to generate data corresponding to the change in position of the mass.

The subject matter described in this patent document can be implemented in specific ways that provide one or more of the following features. For example, the described optical seismometer technology can measure absolute displacement of a suspended mass referenced to the wavelength of laser light, e.g., which can provide a 30-bit resolution digital output without the requirement of a high-resolution analog-digital converter. For example, the disclosed optical seismometer technology can include an optical displacement transducer that combines the attributes of high resolution and wide dynamic range. For example, the bandwidth and resolution can be sufficient to resolve the Global Seismic Network (GSN) low noise model from DC to >15 Hz with a dynamic range sufficient to record the largest teleseisms and most regional and local earthquakes. For example, the described optical seismometer technology can be used in harsh environments, e.g., such as being strung thousands of feet down into a high-temperature borehole, oil/gas and mining industries, exposed to steam, noxious gases and caustic liquids. For example, the disclosed optical seismometer technology can allow the laser and other electronic elements to be located hundreds of meters from the seismometers, and for example, with the only connection made by optical fiber. For example, this exemplary configuration can eliminate heat from electronics in the sensor package, noise pickup from connecting electrical cables, and susceptibility to lightning strikes. For example, unlike standard force-feedback seismometers whose response and calibration are dependent upon numerous electronic and mechanical components, the calibration and response of the disclosed optical seismometer can use three free parameters that can be determined at any time through examination of the data.

BRIEF DESCRIPTION OF THE DRAWINGS

Like reference symbols and designations in the various drawings indicate like elements.

DETAILED DESCRIPTION

Figure 1:
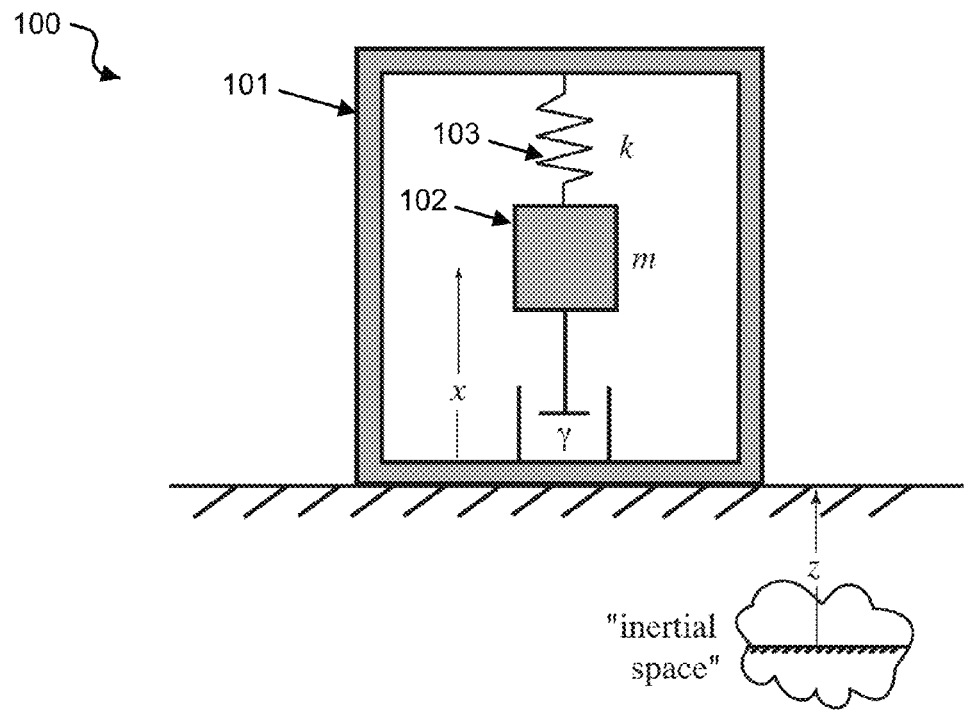
FIG. 1 shows a diagram of an exemplary seismometer.

The techniques, systems, and devices are described for implementing optical seismometers.

One common seismometer design uses an inertial mass suspended on a spring or pendulum where the suspended inertial mass moves in response to vibrations. This exemplary mass-spring sensor is capable of detecting seismic data in even the quietest sites on Earth. For example, using a seismometer design with a moderate size inertial mass, readily achievable free period and damping, the seismically quietest sites on Earth can be noisier than the mass-spring sensor's fundamental Brownian noise.

A primary source of noise in a broadband seismometer can include thermal fluctuations in the seismometer's environment. For example, a borehole can provide an environment of high thermal stability compared to a surface vault, and the seismic noise background may be less in deep boreholes, e.g., away from the Earth's surface where noise is generated by many cultural activities and natural phenomena. Therefore, conventional observatory grade broadband seismometers are operated in a deep borehole, which may yield an improvement in signal-to-noise ratio of the measurements. For example, the seismometer can be implemented in a sonde, e.g., which can be referred to a device for testing physical conditions including seismic data that can be implemented in remote or underwater locations. However, doing so can be problematic, in part because of the associated electronics. For example, there are several disadvantages to electronics for borehole applications. For example, a borehole can be located in a range of hundreds to thousands of feet below the surface and include harsh conditions including high temperatures (e.g., exceeding 100° C.), noxious gases, and/or caustic liquids. For example, high temperatures in the deepest boreholes can limit the lifetimes of conventional electronic components, and even in shallower boreholes, the presence of an electrical cable linking the sensor to the surface can expose the downhole electronics to the risk of damage from lightning strikes. Also for example, there can also be an issue of added noise to the seismometer (e.g., lowering the signal-to-noise ratio of the measurement) due to the heat that electronics generate and the perturbation to the sensor from the resulting convection cells when the electronics are located nearby.

The disclosed technology includes a seismometer instrument having an optical sensor device. For example, the disclosed optical-based seismometer can operate without electronics, e.g., using only optical fibers between the borehole sonde and the surface, in which fiber optic data feeds transfer to electronics once safely at the surface. For example, the use of optical elements in the seismometer sensor can allow operations in harsh (e.g., high temperature or high pressure) environments. For example, the absence of electrical cable(s) to a seismometer instrument, e.g., for routine operation, can have a number of advantages.

For example, the described optical seismometer can be configured as a vertical instrument that performs in a manner similar to that of observatory sensors yet can operate within a borehole without electronics, e.g., using an optical displacement transducer instead of the traditional electronic displacement transducer. For example, the disclosed optical seismometer can include a spring-suspended mass whose position is monitored interferometrically, e.g., by an optical displacement transducer to measure the motion of the inertial mass. The exemplary optical displacement transducer can include a Michelson interferometer illuminated with a light energy source (e.g., a laser, for example, such as a 1 mW unstabilized He—Ne laser (633 nm wavelength)) that is linked to the seismometer with optical fibers. The exemplary optical seismometer can include a processing unit (e.g., a digital signal processor (DSP)) that samples the interference fringe signal to detect and analyze seismic data by seismometer mass displacement. The exemplary optical displacement transducer can combine attributes of high resolution and wide dynamic range. For example, the exemplary optical seismometer can produce a 400 samples/sec record of the seismometer mass displacement with a root mean square noise per octave band, e.g., which can vary from approximately $4 \times 10^{-12}$ m at 0.001 Hz to $4 \times 10^{-13}$ m at 1 Hz. In some examples, the maximum displacement can be limited mechanically to a few millimeters, e.g., providing a dynamic range of at least $10^9$, equivalent to 30 bits (180 dB). Exemplary implementations were performed on a modified STS1 vertical seismometer whose electronics have been replaced with an optical system. The exemplary implementations performed produced data, e.g., which includes comparative data with other seismometers that show, e.g., in terms of both noise and signal fidelity, that the disclosed optical seismometer is an effective seismometer. For example, the disclosed optical seismometer can be as sensitive as the best observatory instruments, yet also can operate within a borehole without electronics.

For example, elimination of electronics can mean the elimination of force feedback. Originally, force feedback was implemented in seismometry to obtain an electrical signal with a known, stable, shaped response. The paradigm in seismometry for the past several decades has suggested that force feedback is required for a high-quality, broadband seismometer. For example, exemplary implementations were performed in a surface vault using an exemplary optical seismometer that does not use feedback (e.g., an open-loop seismometer). Exemplary data obtained includes seismograms that were compared to those collected with more conventional observatory seismometers.

FIG. 1 shows a diagram 100 of an exemplary seismometer, e.g., which can be used to infer ground motion with respect to an inertial reference frame (z) from a record of a spring supported mass's position with respect to the instrument frame (x). As shown in FIG. 1, the exemplary seismometer includes a frame 101 that suspends a mass 102 attached to a spring 103. For example, in seismology, what is desired is the displacement of the ground (or time derivatives thereof) relative to a quasi-inertial space, e.g., which can represent a practically unobtainable reference frame. Instead, what can be measured is the ground displacement relative to an approximation of inertial space. For example, FIG. 1 shows a mass (m) suspended from a spring (or, for example, in the case of a horizontal seismometer, a mass suspended from a pendulum). The displacement of the ground with respect to inertial space, z(t) can be inferred based on the mass-to-ground displacement record, x(t), and knowledge of the mechanical characteristics of the mass-spring system (e.g., spring constant, k, mass, m, and damping coefficient, γ). These exemplary parameters are related by Eq. (1):

$$m\ddot{x} + \gamma\dot{x} + kx = -m\ddot{z} \quad (1)$$

Measuring x to infer z can be difficult with a realizable mass-spring suspension, which can encounter two exemplary problems. For example, real ground motions can cover a huge range, both in amplitude and frequency, which can place great demands on the system that measures the seismometer's mass position as a function of time. Also for example, a real spring only approximates Hooke's law. Force feedback can be used solve these two exemplary problems. For example, instead of recording the displacement of the mass, one can record the force required to maintain a constant position of the mass relative to its frame; e.g., this force record is directly proportional to the ground acceleration. An electrically driven force transducer (e.g., a coil-magnet arrangement or an electrostatic system) can be constructed to have a linear relationship between voltage and force, e.g., which can be more linear than the relationship between force and displacement for the case of a spring. And because in a force feedback system the seismometer mass hardly moves, the requirements on linearity and dynamic range of the displacement transducer are relaxed.

Without force feedback, these two exemplary problems (e.g., the range required and spring imperfections) must be solved in other ways. Implementation of the disclosed optical displacement transducer can solve the exemplary range requirement problem. Implementation of numerical modeling of the nonlinearity in the spring can correct the remaining interesting records. For example, the disclosed optical seismometer can be implemented in an exemplary glass and metal sonde that can be permanently buried in a high-temperature borehole connected to the surface by only optical fibers. Implementing the disclosed optical seismometer can effectively measure seismic data while not requiring force feedback nor electronics.

Figure 2A:
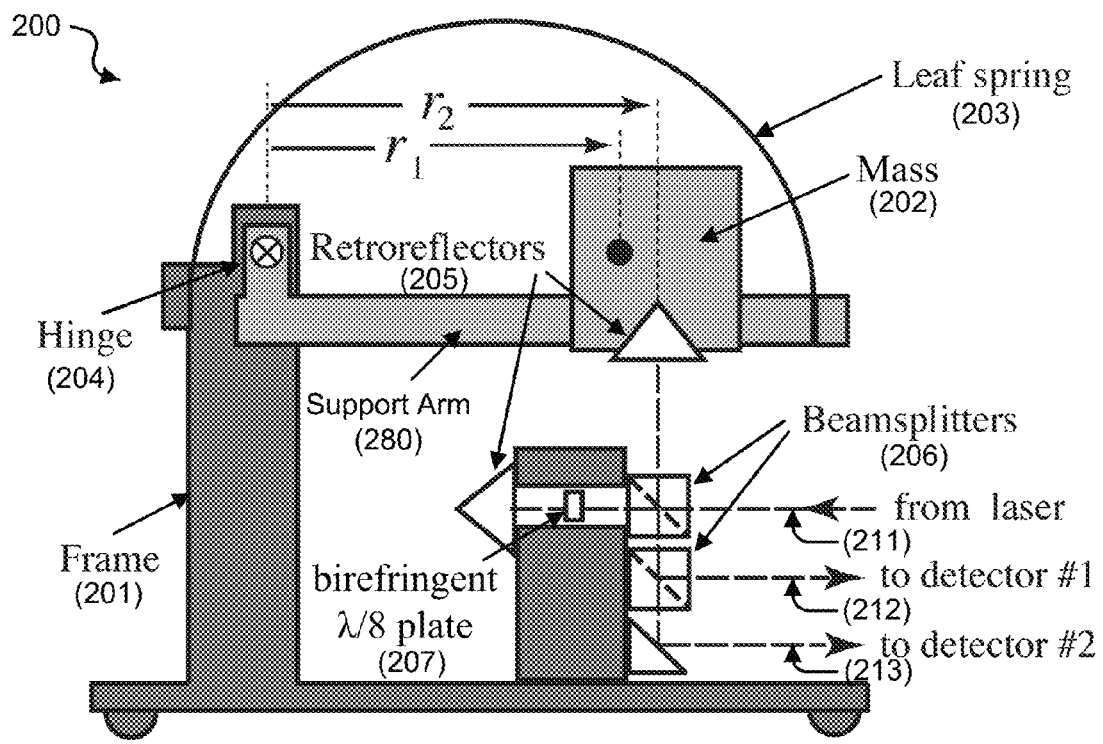
FIG. 2A shows an exemplary seismometer that includes an optical system of the disclosed technology.

FIG. 2A shows an exemplary schematic depicting a seismometer system 200 that includes an optical system of the disclosed technology. It is noted that in FIG. 2A the geometry and components shown are not to scale, e.g., to allow inclusion of the optical components in the exemplary diagram. For example, FIG. 2A depicts a schematic of a modified STS1 vertical seismometer (e.g., Wielandt-Streckeisen STS1 seismometer) used to operate a non-feedback sensor. It is noted that the relative positions of the spring clamps and the hinge in FIG. 2A have been distorted to clarify other components in FIG. 2A. For example, the seismometer system 200 includes a frame 201 that supports a pendulum mass 202. A support arm 280 is movably engaged to a hinge 204 on the frame 201 and is used to hold the pendulum mass 202. A leaf spring 203 is provided to have one end fixed to the frame 201 and the other end engaged to the support arm 280 so that the pendulum mass 202 is suspended by the leaf spring 203 to move around the hinge 204. The support arm 280 moves around with respect to the hinge 205 with expansion and contraction of the leaf spring 203. Under action of the gravity to the mass 202, as the frame 201 moves with the local vibration, the mass 202 moves relative to the frame 201 with expansion and contraction of the leaf spring 203. Under this design, the arrangement of the seismometer system 200 provides a single degree-of-freedom for the motion of the mass 202. The seismometer system 200 can include an optical displacement transducer that includes one or more corner-cube retroreflectors 205 (e.g., corner-cube retroreflectors) that can be attached to the pendulum mass 202 and to the frame 201 (e.g., below the mass 202) and additional optical components attached to the seismometer (e.g., attached to the frame beneath the pendulum mass) to form an interferometer (e.g., a Michelson interferometer). The exemplary optical displacement transducer can include a light energy source (e.g., a laser) that illuminates the exemplary Michelson interferometer. For example, the laser can be linked to the seismometer with optical fibers and be located at a substantial distance away from the seismometer, e.g., outside of an exemplary borehole. For example, an optical path 211 can represent an optical fiber or other medium to transfer an optical signal from the light energy source to the exemplary Michelson interferometer. For example, the exemplary Michelson interferometer is configured to be sensitive to changes in the optical paths defined by beamsplitters 206 and the retroreflectors 205. For example, two exemplary optical paths can be formed by the upper beamsplitter and the two exemplary retroreflectors 205, e.g., one on the pendulum mass 202 and the other fixed to the frame 201. For example, by using polarization selective components and a birefringent plate 207 (e.g., a birefringent λ/8 plate), two fringe signals representing sine and cosine values of the optical phase are generated, e.g., by two photodetectors. For example, an optical path 212 and 213 can represent optical fibers or other medium to transfer the exemplary fringe signals from the exemplary interferometer optics to the exemplary photodetectors. For example, the exemplary photodetectors can be located at a substantial distance away from the seismometer, e.g., outside of an exemplary borehole. The exemplary optical seismometer can include a processing unit (e.g., a DSP) that samples the two exemplary fringe signals to detect an event by the displacement of the mass 202. Analysis of these two exemplary signals can be performed by the exemplary DSP to determine the mass displacement. For example, the exemplary processing unit can be located at a substantial distance away from the seismometer, e.g., outside of an exemplary borehole. For example, the fractional part of each cycle can be computed, and the total number of full cycles can be tracked, e.g., giving both high resolution and wide dynamic range.

For example, a long free period is achieved in the exemplary STS1 seismometer system 200 by means of the leaf-spring geometry. Damping for described exemplary implementations is provided by shorting the coil normally used for force feedback in the STS1. The exemplary modified STS1 seismometer using the optical system (shown in the seismometer system 200 in FIG. 2A) was used in exemplary implementations to collect exemplary data presented in this patent document. This exemplary modified STS1 seismometer of the disclosed technology can be referred to as the iSTS1 (e.g., interferometric STS1).

For example, for small motions and neglecting rotational terms, a structure such as the iSTS1 shown in FIG. 2A follows an equation slightly different from Eq. (1). For example, if the distance between the hinge point and the pendulum's center of mass is $r_1$, then the pendulum height change x(t), measured at a distance $r_2$ from the hinge point, is related to ground motion by Eq. (2):

$$\ddot{x} + G_1 \frac{\gamma}{m} \dot{x} + G_1 \frac{k}{m} x = -G_1 G_g \ddot{z}. \qquad (2)$$

In Eq. (2), $G_I$ is defined by $G_I = mr_1^2/I$, where I is the moment of inertia of the pendulum around the hinge axis, and $G_g$ is defined by $G_g = r_2/r_1$, which is a geometric gain determined by the moment arm of the position of the displacement transducer. The coefficients k and γ are defined as previously described, except their determinations depend on the details of where the spring and damping mechanism are connected to the pendulum. Defining the quantities, $$\omega_0^2 = G_1 \frac{k}{m} \qquad (3)$$

and $$Q = \frac{1}{\gamma} \sqrt{\frac{mk}{G_1}} \qquad (4)$$

where $\omega_0$ is $2\pi/T$ (e.g., T is the free period) and Q is the oscillatory quality factor, gives a governing equation:

$$\ddot{x} + \frac{\omega_0}{Q} \dot{x} + \omega_0^2 x = -G\ddot{z}. \qquad (5)$$

Eq. (6) is introduced, for example, for simplification:

$$G = \frac{mr_1 r_2}{I} = G_I G_g. \qquad (6)$$

Examination of Eq. (5) provides some insight into the characteristics and limitations of an open-loop seismometer. For example, at long periods, the third term on the left-hand side of Eq. (5) will dominate, the mass position will represent ground acceleration, e.g., much as in the case of a gravity meter, and the sensitivity will be improved as the free period is increased (or $\omega_0$ is decreased). For example, at frequencies much higher than the resonance of the suspension, the first term on the left dominates giving $\ddot{x} \approx -G\ddot{z} \rightarrow x = -Gz$. In this exemplary situation, the pendulum remains almost stationary in inertial space while the ground oscillates around it, and the mass displacement will represent ground displacement.

For example, Eq. (5) is similar to Eq. (1) except for the G factor. Thus, a pendulum can be represented with a finite moment of inertia as an approximation to the simple mass-spring system. The exemplary factor G holds an important distinction. For example, for a point mass, the moment of inertia around the axis defined by the hinge is $I = mr_1^2$, giving a value of 1 for $G_I$. For example, for real, extended masses, $G_I < 1$ leads to a longer free period T (Eq. (3)). For example, one measure of the sensitivity of a seismometer is in its free period, and for example, longer is considered better. However, for example, while the moment of inertia can be increased to lengthen the free period, the sensitivity may not be improved in doing so. The long-period approximation of Eq. (5) exhibits the factor $G_I$ on both sides, e.g., indicating that the sensitivity may not be as simple to determine as knowing the free period.

For example, the transfer function T(ω) between the complex representations of mass position X(ω) and ground acceleration $\omega^2 Z(\omega)$ is represented in Eq. (7) as:

$$|T(\omega)| = \left| \frac{X(\omega)}{\omega^2 Z(\omega)} \right| = \frac{G}{\left[ (\omega^2 - \omega_0^2)^2 + \frac{\omega^2 \omega_0^2}{Q^2} \right]^{1/2}} \qquad (7)$$

For example, for spectral analyses, Eq. (7) can be used to scale a spectrum of mass position to a spectrum of ground acceleration. For time series conversion of mass position to ground acceleration, numerical solutions of Eq. (5) can be used.

An exemplary assessment of the transducer noise and dynamic range is described. For example, the first step in assessing the potential performance of an open-loop optical seismometer can include determining the noise spectrum of x and examining how that will translate into a noise spectrum of $\ddot{z}$, e.g., given the values of the mechanical coefficients in Eq. (5). Exemplary implementations were performed to collect a time series of x while the seismometer is clamped, e.g., observing only noise in the displacement transducer. For example, can be performed with a separate apparatus. For example, a null interferometer was fabricated identical to the exemplary interferometer shown in FIG. 2A, except that, e.g., rather than being attached to a spring-suspended mass, the second retroreflector was mounted in a fixed position but slightly movable via a piezoelectric transducer. This exemplary configuration allowed a small modulation of the optical path to be imposed for tuning of the interferometer and establishing the quadrature fringe ellipse for signal processing.

The optical seismometer system in FIG. 2A is based on an interferometer that extracts useful seismic information from interference of two signals. More specifically, the interferometer in FIG. 2A can be implemented based on optical displacement transducers that combine the attributes of high resolution and wide dynamic range developed by Zumberge et al. in 2004 as described in U.S. Pat. No. 7,224,463 entitled "RESOLVING QUADRATURE FRINGES OF INTERFEROMETER SIGNALS IN REAL TIME" and U.S. Pat. No. 8,023,116 of the same title, both of which are incorporated by reference as part of the disclosure of this patent document.

Figure 2B:
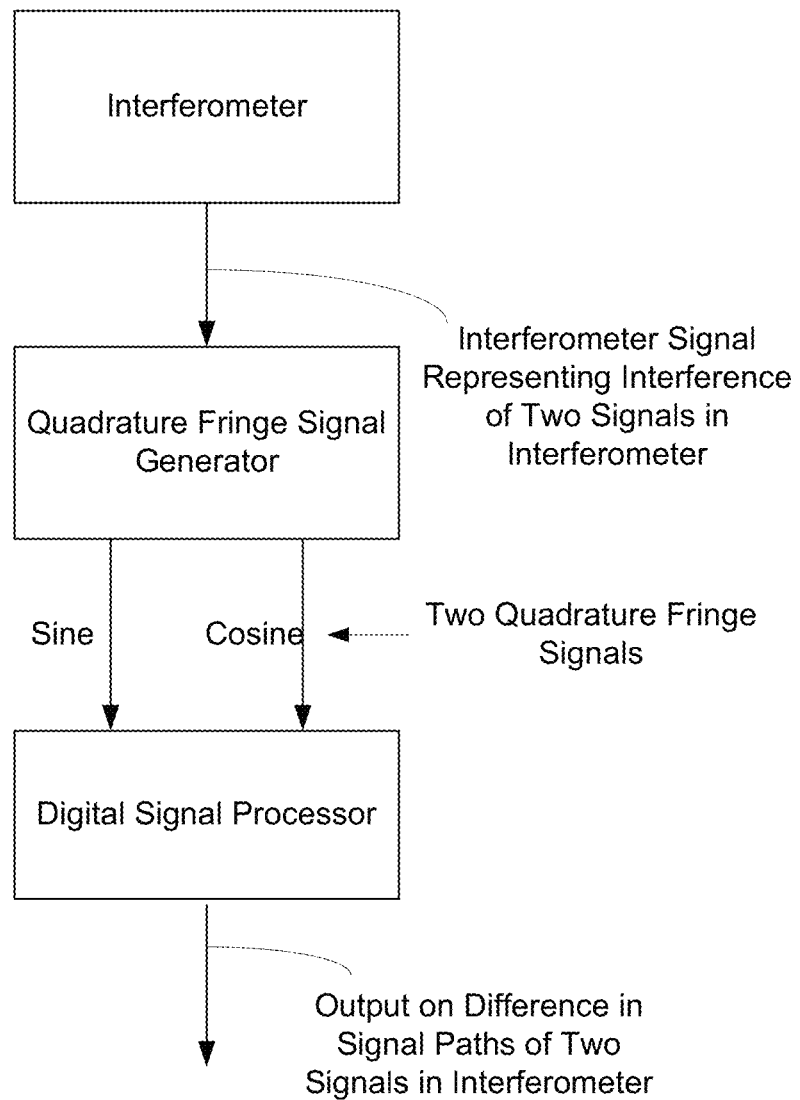
FIG. 2B illustrates an exemplary interferometer device with digital processing for resolving quadrature interference fringes according to one implementation, e.g., where the interferometer may be an optical interferometer, an electronic interferometer, or other interferometers.
Figure 2C:
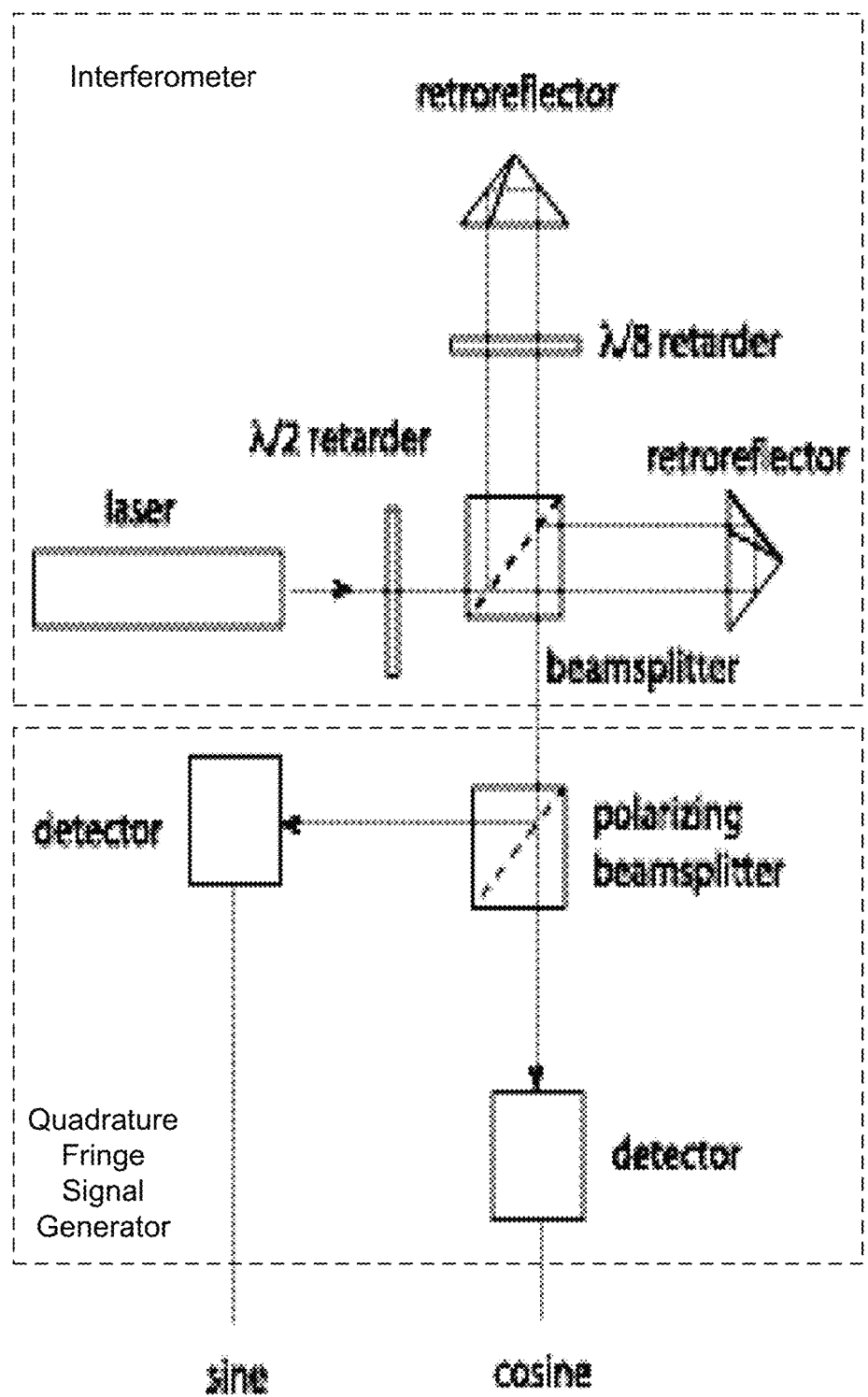
FIG. 2C shows an exemplary optical implementation of the device in FIG. 2B, e.g., where a Michelson optical interferometer is used as the interferometer in which one of the arms is lengthened by a quarter of a wavelength for one polarizations state and a polarizing beamsplitter separates the two fringe signals yielding a quadrature output.
Figure 2D:
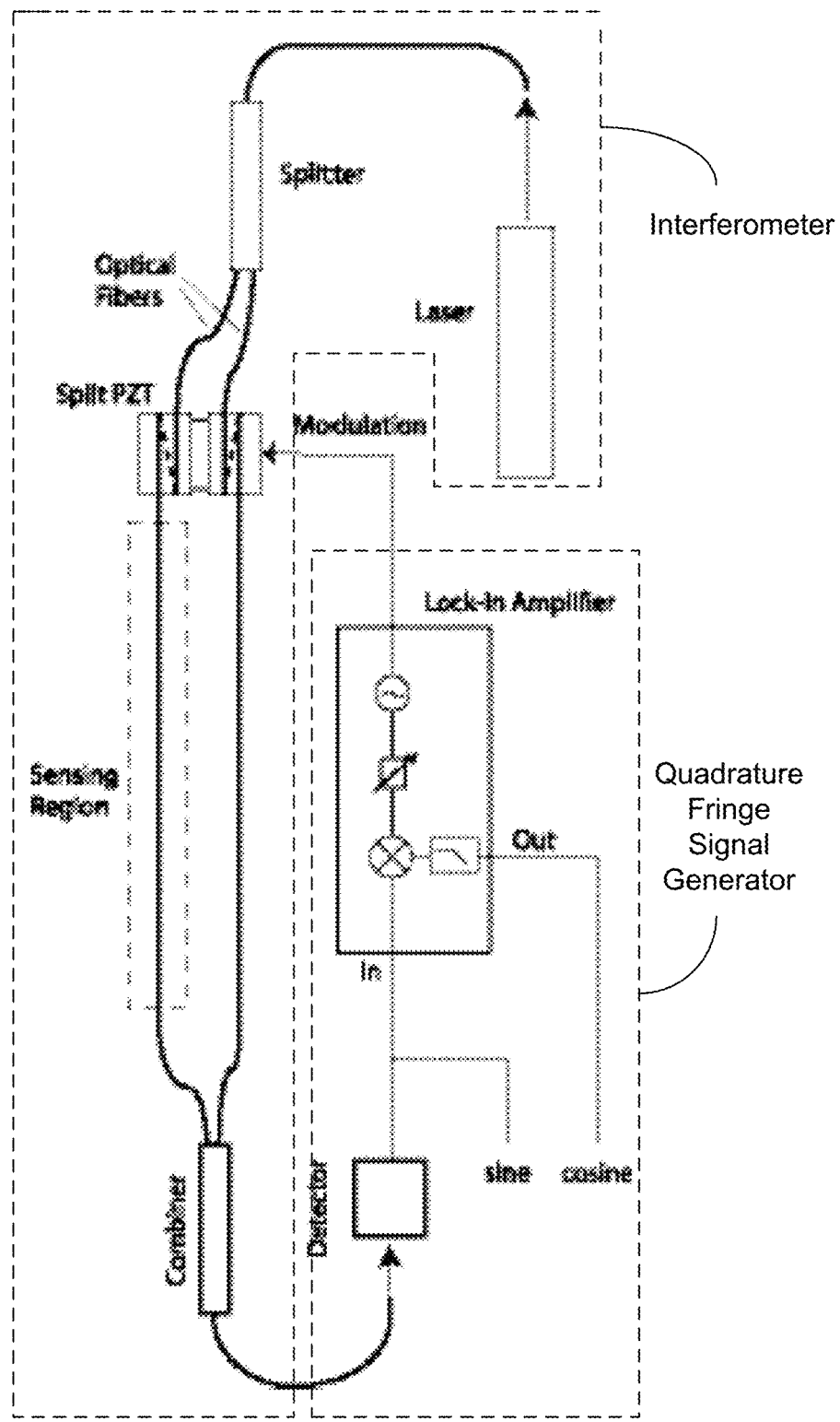
FIG. 2D shows another exemplary optical implementation of the device in FIG. 2B, e.g., where a Mach-Zehnder interferometer is formed with optical fibers and a quadrature output is generated with analog electronics by differentiating the fringe signal with a lock-in amplifier. A split PZT modulator modulates the two arm lengths 180° out of phase with each other.

The examples of interferometer designs for efficiently resolving quadrature fringes with a high resolution using digital signal processing are described in details with respect to FIGS. 2B, 2C and 2D.

In one implementation, two quadrature fringe signals from an interferometer which causes two signals in two signal paths to interfere with each other are sampled to obtain digital data samples from the two quadrature fringe signals. The digital data samples are used to perform a linear least square fitting to establish coefficients for an ellipse traced by the two quadrature fringe signals as a phase difference between the two signal paths changes. A pair of digital data samples are respectively obtained from the two quadrature signals at a given moment and are used to compute a corresponding phase difference between the two signal paths of the interferometer from established coefficients of the ellipse. The coefficient for the ellipse can be updated over time. This digital processing allows for real time processing.

In another implementation, an interferometer device may include an interferometer to produce an interferometer signal indicative of interference of two signals, a quadrature fringe signal generator to produce two fringe signals in quadrature, and a digital signal processor that processes the two quadrature fringe signals. The relative phase of the two quadrature fringe signals depends on the sign of the time rate of change in the difference between the signal paths of the two signals in the interferometer, e.g., the difference in the optical paths of two optical signals in an optical interferometer. The two quadrature fringe signals are digitized and analyzed in real time in the digital signal processor to yield a linear, high resolution, wide dynamic range displacement transducer.

The quadrature fringe signal generator in one implementation may include a signal splitter to split the interferometer signal into a first interferometer signal as the first quadrature fringe signal and a second interferometer signal. The second interferometer signal is processed to produce a phase shift of 90 degrees as the second quadrature fringe signal. The two quadrature fringe signals are converted into digital signals for processing by the digital signal processor. When the interferometer is an optical interferometer, the optical interferometer signal produced from interference of two optical signals may be optically split into two optical interferometer signals to two optical detectors where one optical detector output may be phase shifted for 90 degrees to produce two quadrature fringe signals. Alternatively, a single optical detector may be used to convert the optical interferometer signal into an electrical interferometer signal which is split into two electrical interferometer signals. One signal is then phase shifted by 90 degrees.

The digital signal processor may be configured to process the two quadrature fringe signals to construct an ellipse. The coefficients of the constructed ellipse are used to digitally extract the variation in the difference of the signal paths of two signals in the interferometer. In one implementation, the digital signal processor is configured to obtain the fitting equation for the ellipse in nonparametric form and use linear least square fit to find the coefficients of the ellipse. This processing can be efficient and be completed in a relatively short time to achieve nearly real-time processing of quadrature fringe signals.

FIG. 2B illustrates one implementation of an interferometer with a digital signal processor for digitally resolving quadrature fringes. The device includes an interferometer to produce an interferometer signal indicative of interference of two signals, a quadrature fringe signal generator to produce two fringe signals in quadrature, and a digital signal processor that processes the two quadrature fringe signals. The relative phase of the two quadrature fringe signals depends on the sign of the time rate of change in the difference between the signal paths of the two signals in the interferometer, e.g., the difference in the optical paths of two optical signals in an optical interferometer. The two quadrature fringe signals are digitized and analyzed in real time in the digital signal processor to yield a linear, high resolution, wide dynamic range displacement transducer. Interferometers may be implemented in various forms, including electronic and optical interferometers. In the following description, optical interferometers are described as examples to illustrate various features and operations of the device in FIG. 2B.

Optical interferometry, widely used to quantify observables ranging from displacement to pressure, sometimes suffers from the relative coarseness of the wavelength of light. An interferometer in which displacement is monitored by counting fringes resolves only 0.6 µm if a HeNe laser is used as the source. Of course, in many applications, fringes can be finely divided electronically, but there is often a sacrifice in other aspects of the system, such as dynamic range, directionality, presence of dead-bands (e.g., in a Fabry-Perot), or the need for feedback to the system under test to provide stabilization of the interferometer to a "quadrature" point.

In optical interferometry, the optical length difference between two routes along which coherent light travels is measured through the interference. When combined, the two optical waves interfere and generate "fringes," which are variations in the intensity of the combined light when it strikes a photo-detector. In various optical interferometers, the variation of intensity I varies sinusoidally with the difference in optical path lengths $\Delta_{op}$ according to:

$$I = I_0 + a\sin\left[\frac{2\pi}{\lambda}\Delta x_{op}\right]$$

The above variation of the intensity with the optical path length difference does not have a one-to-one mapping relationship. The change in I that results from a change in $\Delta x_{op}$ is ambiguous in direction information because the arcsine function is multi-valued. The information on the direction of the change can be obtained from a second source of information. For example, a second fringe signal in quadrature to the original. The directionality may be obtained by electronically generating a quadrature signal. In one implementation, the derivative of the direct fringe signal may be calculated by using a phase-sensitive detector such as a lock-in amplifier to process the direct fringe signal. The lock-in amplifier in this implementation operates as an analog computer which calculates the derivative of the input signal. Since the derivative signal is approximately 90 degrees out of phase with the original fringe signal, the recording the fringe signal and its derivative allows for tracking of both the magnitude and the sign of optical path changes (which are proportional to pressure changes or changes in a selected parameter under monitor).

The direct fringe signal x and the quadrature signal y are two sinusoids that are, in general, of different amplitudes and not exactly 90° out of phase. The quadrature signals x and y track an ellipse when plotted against each other. The resultant ellipse provides the directional information. At a given instant in time, an x-y output is a point on the ellipse. As the optical path increases (decreases), the point moves clockwise (counterclockwise) along the perimeter of the ellipse. The angular position or phase p of the point on the ellipse is linearly related to the change in the different optical signal paths. This change may be used to measure a variation in pressure, temperature or other parameters that cause the change in the difference of the optical paths of the optical interferometer. This use of the angular position or phase p of the point on the ellipse allows the measurement of the change in the optical path change of the optical interferometer to be measured accurately with much higher resolution than the conventional counting of optical fringes. Notably, the present digital processing allows for the accurate measurement of the angular position or phase p of the point on the ellipse to be carried out in nearly real time.

Two exemplary optical interferometer sensors are described below to provide, among other features, both wide dynamic range and high resolution in optical path length change. One sensor is a seismometer, in which the displacement of a mass on a spring is monitored with a free-space Michelson interferometer. The other sensor is a fiber optic pressure sensor in which pressure induced strain in an optical fiber is monitored with a Mach-Zehnder interferometer. See, e.g., Zumberge et al. in "An optical fiber infrasound sensor: A new lower limit on atmospheric pressure noise between 1 and 10 Hz," J. Acoust. Soc. Am. 113, 2474-2479 (2003). In both sensors, the resolution in displacement can be of a few picometers along with the ability to follow displacements that may span many millimeters. A digital signal processor (DSP) based fringe resolver is used to achieve the above operation with novel processing techniques. Two fringe signals that are approximately in quadrature are input to a fast A/D converter. An algorithm in the DSP samples the quadrature fringe signals and continually updates the parameters of an ellipse that characterizes the fringe pattern while instantaneously computing the optical phase. A resolution of $5 \times 10^{-13}$ mHz$^{-1/2}$ was obtained at 2 Hz. The real-time aspect of this method produces important advantages over similar methods such as those described by Eom et al. in "The dynamic compensation of nonlinearity in a homodyne laser interferometer," Meas. Sci. Technol. 12, 1734-1738 (2001) and by Heydemann in "Determination and correction of quadrature fringe measurement errors in interferometers," Applied Optics 20, 3382-3384 (1981).

FIGS. 2C and 2D illustrate two examples of optical interferometers with quadrature fringe signals suitable for the present digital processing of the optical fringes.

FIG. 2C shows a simple Michelson interferometer modified to produce two fringe signals that are in quadrature. A birefringent element (a $\lambda/8$ phase retarder) in one of the two arms lengthens the optical path for one polarization by $\lambda/4$ in one round trip. Illuminating the interferometer with both polarizations (by adjustment of a $\lambda/2$ phase retarder before the beamsplitter) and separating the two fringe signals with a polarizing beamsplitter produces the sine and cosine components of the optical phase difference.

FIG. 2D shows a Mach-Zehnder interferometer made of optical fibers to produce sinusoidal fringes. The two arms of this particular interferometer are implemented with two piezoelectric modulators which are modulated out of phase by about 0.01 fringe at 156 kHz to produce quadrature fringe signals. The output of the photodetector x is input to a lock-in amplifier which demodulates the fringe signal at the same frequency to generate an output y that is proportional to the spatial derivative of the fringe signal:

$$y \propto \frac{\partial x}{\partial L}$$

Like the device in FIG. 2A, the two fringe signals x and y so obtained in FIG. 2B trace out an ellipse as the optical path difference L changes.

Imperfections in both systems make the ellipse shape somewhat variable in time. For example, polarization drift in the fiber for the case of the optical fiber interferometer, and optical alignment in the case of the free-space Michelson, may account for gradual evolution of the shape of the ellipse. The goal of the DSP is to compute the optical phase p continually from samples of x and y given the parametric equations:

$$x = x_0 + a \sin(p + p_0)$$

$$y = y_0 + b \cos p$$

where x and y are the two voltage outputs from the detectors, a and b are the amplitudes of the two fringe signals, $x_o$ and $y_o$ are the offsets, and $p_o$ is a constant phase offset from imperfections in electro-optic system (the fringe signals do not have to be exactly in quadrature).

The exemplary light source was coupled to and from the test interferometer with optical fibers to closely mimic a future borehole system.

Figure 3:
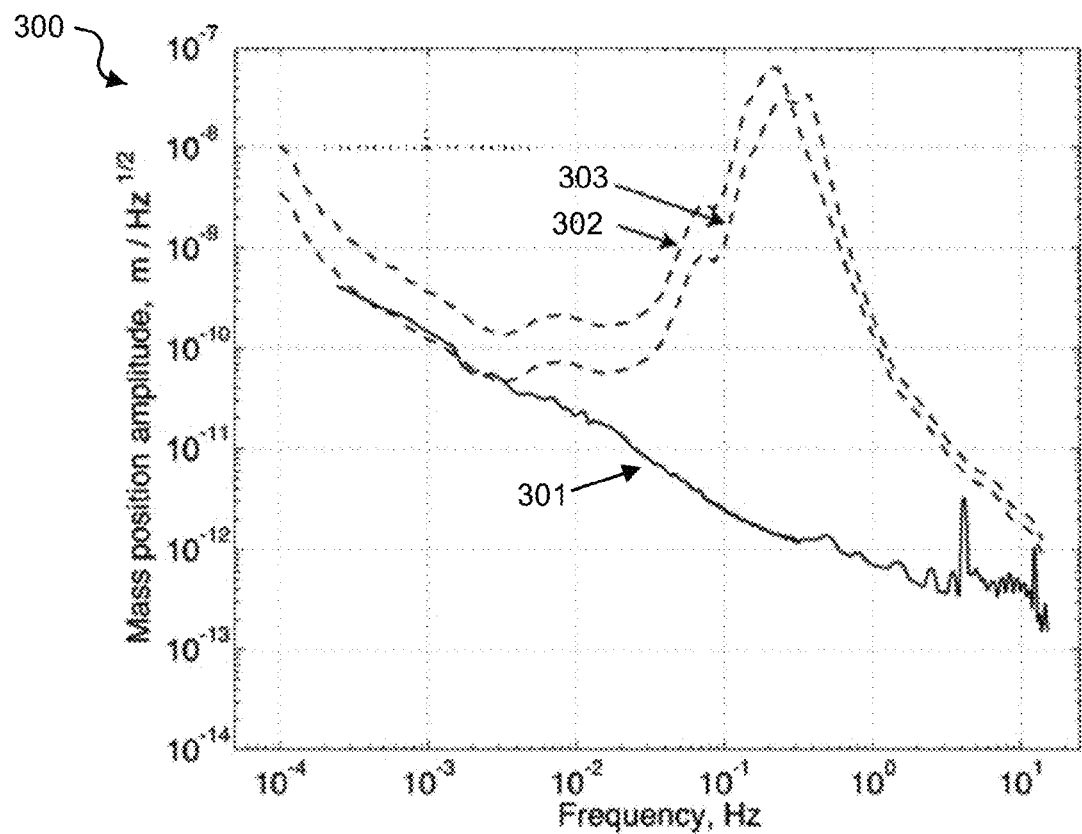
FIG. 3 shows a data plot of an estimate of null interferometer noise.

FIG. 3 shows a data plot 300 of an estimate of null interferometer noise. The data plot 300 includes data 301, represented by the solid trace, showing the spectrum computed from a 24 hr time series taken 10 days after installation (e.g., which was allowed to stabilize thermally). For example, a time series of apparent path-length changes in x from transducer noise was used to compute a displacement noise spectrum in the data 301. The data plot 300 also includes data 302 and 303 representing theoretical seismometer mass displacement spectra. For the data 302 and 303, a spectrum of ground acceleration equal to that of the minimum low-noise model (LNM) established from the Global Seismic Network (GSN) was assumed. The spectrum data of the data 302 and 303 was converted to mass position assuming two sets of spring-mass coefficients. For example, the data 302 included the coefficients $\omega_0 = 1.23$ sec$^{-1}$ (T=5.15 sec), Q=1.43, and G=0.756. For example, the data 303 included the coefficients $\omega_0 = 2.43$ sec$^{-1}$ (T=2.58 sec), Q=4.5, and G=1.02. Eq. (7) can be used to calculate corresponding mass displacement spectra using two representative sets of values of Q, $\omega_0$ and G for the mechanical sensor. These spectra show what displacement transducer noise is acceptable to allow minimum levels of ground motion to be observed. For example, the exemplary coefficient values of the data 302 and 303 correspond to the iSTS1 and a second instrument. For example, the exemplary interferometer implementation used to acquire data shown in FIG. 3 was set up in the Pinon Flat Observatory (PFO) seismic vault. FIG. 3 shows that for the entire seismic band, the displacement transducer noise is lower than that required to remain below the LNM as long as the free period of the mass-spring system is at least 2.6 sec.

For example, resolution can be one limiting factor, and maximum range can be another. For example, if a mechanical suspension has stops $X_{max}$ at ±5 mm and free period T of 5 sec, then at long periods the sensor can hit the stops under a ground acceleration of $4\pi^2 T^{-2} x_{max} = 8 \times 10^{-3}$ msec$^{-2}$. At high frequencies, the sensor can be limited by the maximum velocity that can be resolved. For example, this limit can be governed by the sampling frequency of the disclosed optical displacement transducer, e.g., which can be configured as 100,000 samples/sec. The exemplary signal processor of the disclosed optical seismometer can accumulate errors from phase ambiguity, e.g., if the mass moves more than about ¼ of an optical wavelength (or about $10^{-7}$ m in displacement) between two successive samples. For example, this can limit mass velocity to a maximum of about 1 cm/sec.

For example, deployment of the exemplary iSTS1 was implemented in the PFO vault beginning in 2007. Exemplary implementations of the disclosed optical seismometer included placing the sensor in a bell jar at moderate vacuum (e.g., 0.1-0.5 atm). For example, the interferometer was illuminated with free-space optics through a window in the vacuum chamber. For example, optical components and the seismometer sensor were set on a granite pier in the vault and covered with an insulated box.

Calibration of the iSTS1 can be achieved by determining the mechanical coefficients $\omega_0$, Q, and G that govern its motion (e.g., Eq. (5)). For example, several methods to determine $\omega_0$ and Q can be used. In one example, a simple ringdown can be implemented, e.g., where the mass is displaced from the equilibrium position and allowed to undergo a damped oscillation. In another example, described subsequently, the Earth tides can be fit.

For example, the mass position during a ringdown (with appropriate selection of t=0) is governed by Eq. (8):

$$x = x_0 e^{-\omega_0 t/2Q} \cos \omega_r t \tag{8}$$

where $x_0$ is the initial displacement, and the ringdown oscillation frequency $\omega_r$ is given by $\omega_r = \Omega_0 \sqrt{1-(2Q)^{-2}}$ (e.g., which can be confirmed by direct substitution into Eq. (5) with $\ddot{z}=0$).

Figure 4:
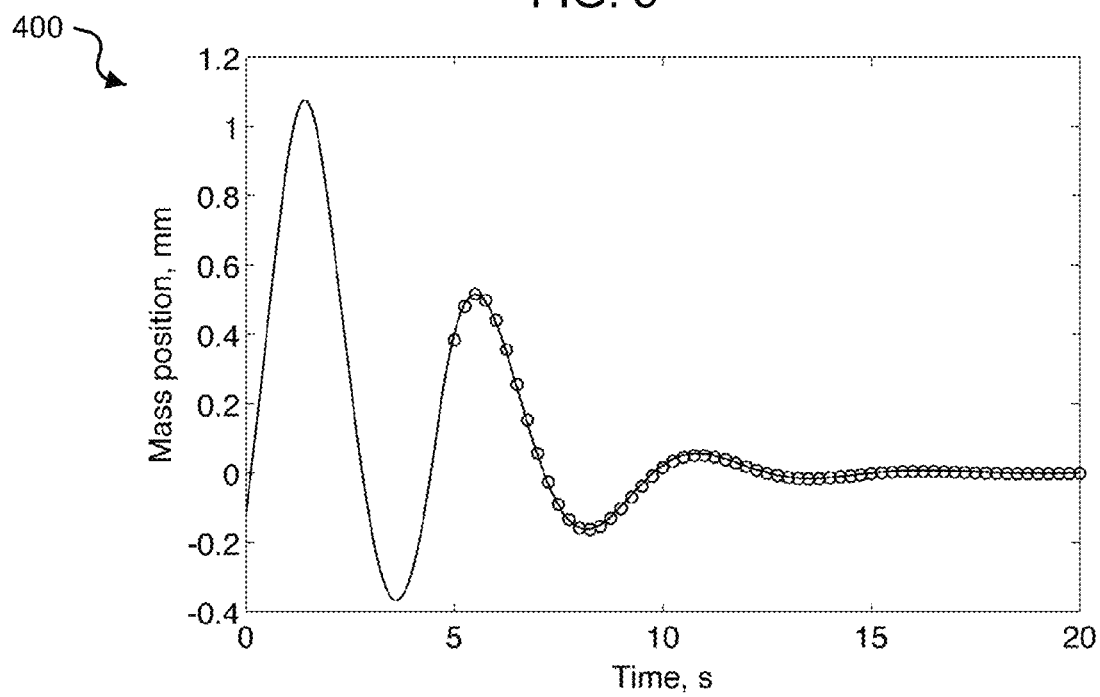
FIG. 4 shows a data plot of observed and nonlinear least-squares fit ringdown data.

FIG. 4 shows a data plot 400 of observed and nonlinear least-squares fit ringdown data. For example, the data plot 400 represents data that can be used to determine the suspension's free period is to fit a damped sinusoid to a ringdown. The exemplary solid line shown in the data plot 400 represents the observed record, and the circles represent the fitted function. FIG. 4 shows an observed ringdown and a nonlinear least-squares fit to Eq. (8). For example, the value for $\omega_0$ from an exemplary implementation is 1.256 sec$^{-1}$ (or T=5.00 sec) with Q of 1.45. For example, an undamped test (Q=19.4) yielded $\omega_0$=1.239 sec$^{-1}$. A slight variability (around 2%) was shown in the fitted value for free period during a ringdown if different sections are analyzed.

For example, in the disclosed open-loop optical seismometer, the response to acceleration at long periods is flat to essentially zero frequency. This can provide an opportunity to utilize tides for calibration without the need for an a priori knowledge of the response (other than the free period), which for example, in a conventional broadband instrument, is a function of the electronic component values. For example, in a conventional broadband seismometer, the gain at the broadband output is lowered at long periods to circumvent saturation from drift. For example, from Eq. (5), tidal periods can be represented by:

$$x = -\frac{G}{\omega_0^2} \Delta g \tag{9}$$

where $\Delta g$ represents the varying part of gravity from tides.

Figure 5:
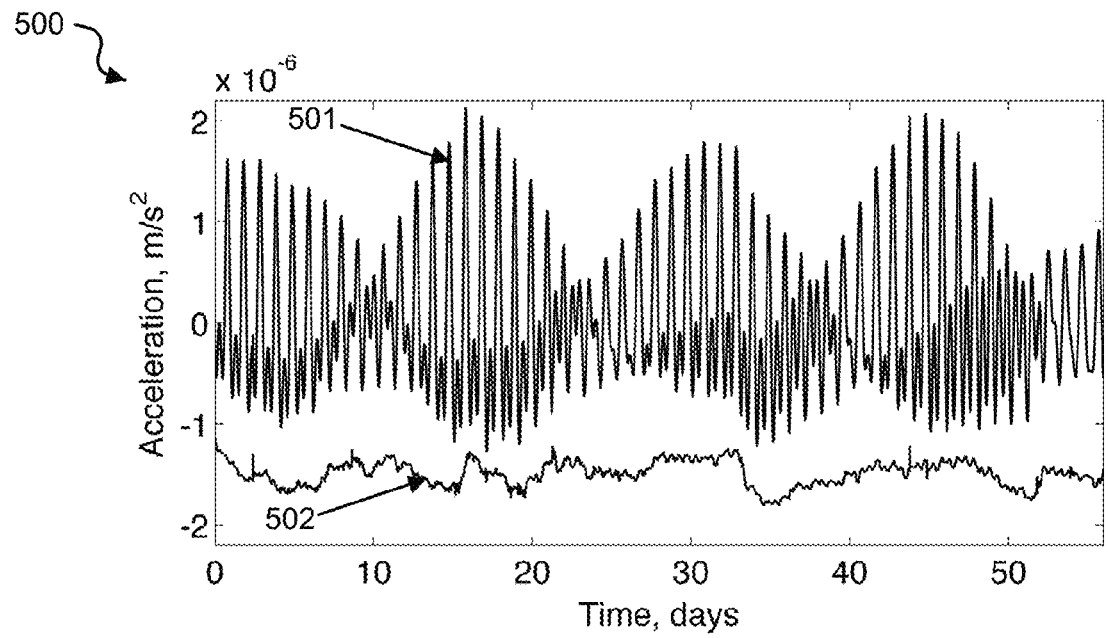
FIG. 5 shows a data plot of exemplary Earth tide data recorded by the interferometric seismometer.

FIG. 5 shows a data plot 500 of exemplary Earth tide data recorded by the interferometric seismometer. The data plot 500 includes a 56 day time series waveform 501 in which mass position (e.g., ~$10^{-6}$ m variation) is scaled to show gravity (e.g., the exemplary data is low-pass filtered with a corner frequency of 0.01 Hz; a polynomial drift and a step function from a temperature change have been removed). The residuals are also plotted showing the difference between the recorded tidal record and the predicted tide. The data plot 500 includes a residual waveform 502 representing the difference between observed acceleration due to gravity and that predicted using code.

Figure 6:
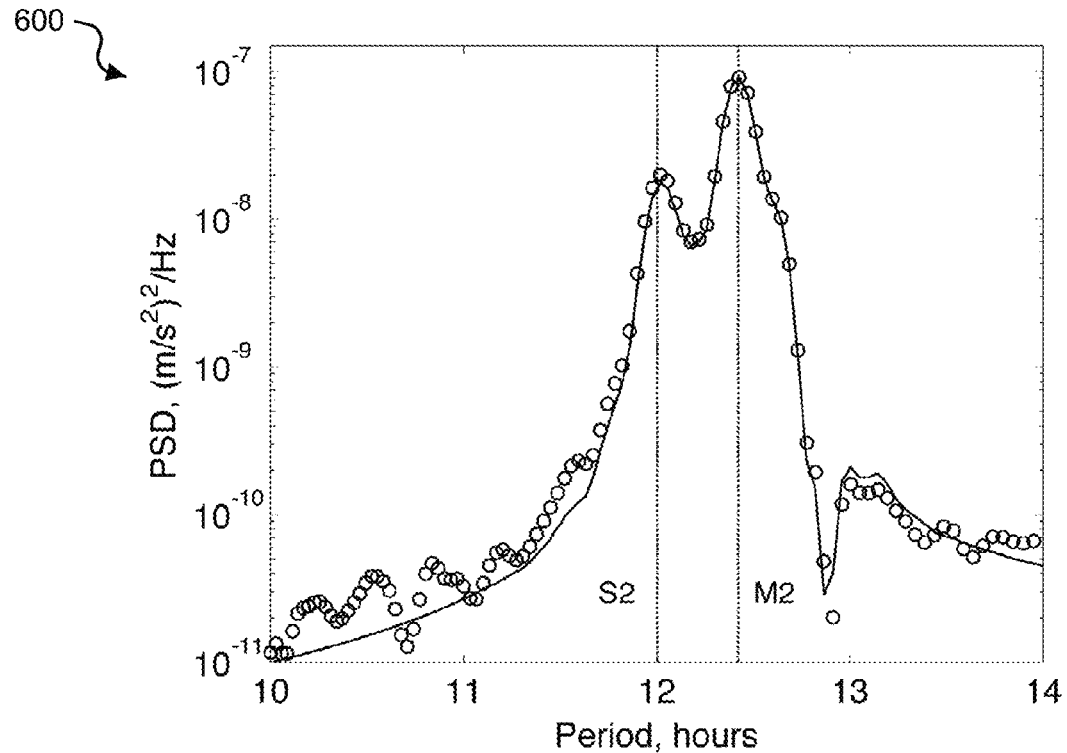
FIG. 6 shows a spectral analysis data plot of the tidal signal utilizing the principal lunar constituent.

FIG. 6 shows a spectral analysis data plot 600 of the tidal signal utilizing the principal lunar constituent, M2, which provides a calibration free from daily temperature variations. The solid line in the data plot 600 represents the theoretical tidal spectrum, and the circles represent the spectral values from the observations scaled to match at the exemplary M2 period. The exemplary scaling factor is represented by $\omega_0^2/G$. For example, as shown in the data plot 600, the power spectrum of the observed mass position is scaled to match the predicted tides at the principal lunar constituent M2 at 12.42 hr period. This exemplary constituent was selected because of its immunity to contamination from pressure and temperature effects that are driven at solar semi-diurnal periods (e.g., S2 at 12.00 hr period), separable from M2 by virtue of the length of the time series. The coefficient in Eq. (9) that best fits the tides at M2 is $G/\omega_0^2$=0.507 sec$^2$. This exemplary value, e.g., combined with the ringdown values of $\omega_0$ given previously, yields an estimate of G of 0.788.

For example, the ringdown method for determination of $\omega_0$ can be considered imperfect when the damping is high (e.g., Q is small) because the ringdown duration is short. Also, it can yield a value of $\omega_0$ during relatively large displacements, which, although in principle should be the same as for small displacements, may not be. For example, an alternative method to determine the coefficients can include recording the very small motions of the mass from a teleseism and determining the transfer function between the open-loop seismometer and any other seismometer whose response is known. For example, the parameters of the modeled responses can be found by a least-squares fit to the transfer function.

Figure 7:
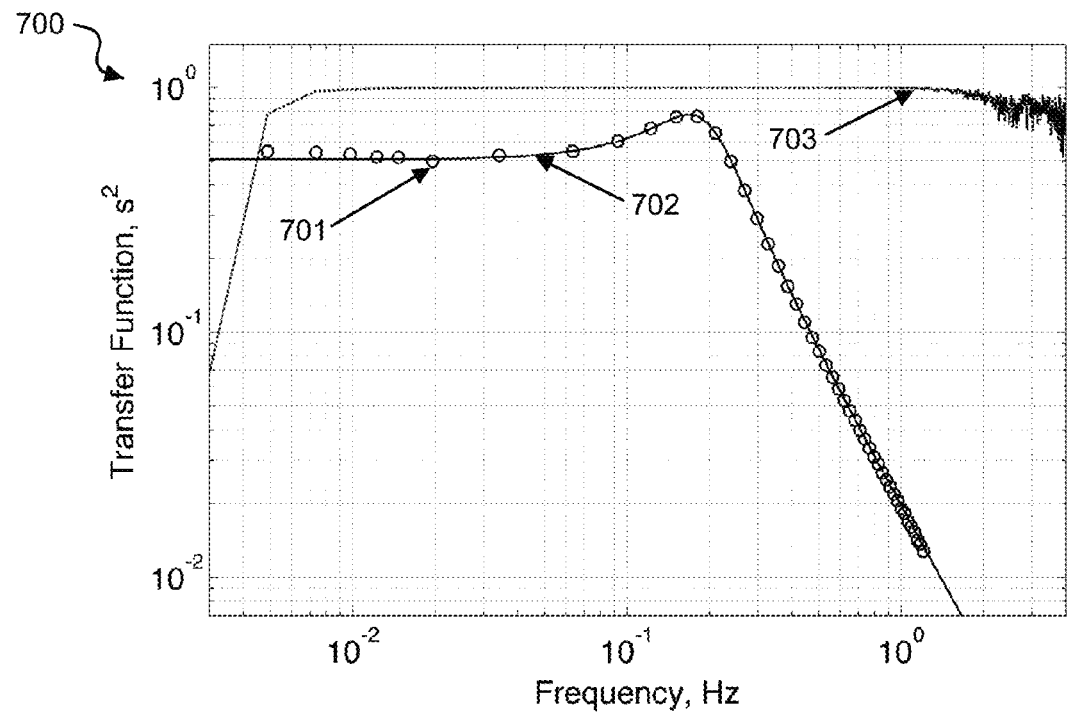
FIG. 7 shows a data plot of the magnitude of the estimated transfer function and the coherence between the seismograms.

FIG. 7 shows the results of such an analysis. FIG. 7 shows a data plot 700 of the magnitude of the estimated transfer function and the coherence between the seismograms. For example, the data plot 700 includes the observed transfer function 701 between the iSTS1 and a conventional STS1 at the same location plotted as points, and the modeled transfer function 702 (e.g., using Eq. (7) to fit to the observations) plotted as the solid curve, e.g., which asymptotically intersects the vertical axis at the value $G/\omega_0^2$. The data plot 700 also includes data trace 703 representing the coherence between the seismograms. For example, the best fit, using an 8 hr record following a magnitude 7.9 earthquake in China (e.g., 12 May 2008, eastern Sichuan region), yielded a value for $\omega_0$ of 1.22 sec$^{-1}$ (or period of 5.15 sec), Q of 1.45, and a value for G of 0.755. The maximum mass displacement during the exemplary record was 30 μm. The exemplary individual values of $\omega_0$ and G determined by these different methods vary somewhat; and the exemplary calibration factor calculated for tidal frequencies was shown to agree with the value from an earthquake analysis, e.g., both giving values of G I $\omega_0^2$=0.507 sec$^2$.

For example, at long periods the determining factors for calibration include G, $\omega_0$, and the laser wavelength. Both G and the laser wavelength can be stable, e.g., to a part per million. For example, if $\omega_0$ were to change by as much as 0.05% by relaxation of the spring, then the mass may hit the stops (e.g., assuming the sensor is in a fixed orientation, tilting the sensor can also change $\omega_0$). Therefore, this can assure that, once calibrated and fixed in orientation (e.g., as would be the case if the sensor were cemented into a borehole, for example), the calibration factor will not change significantly as long as the sensor continues to operate.

Figure 8:
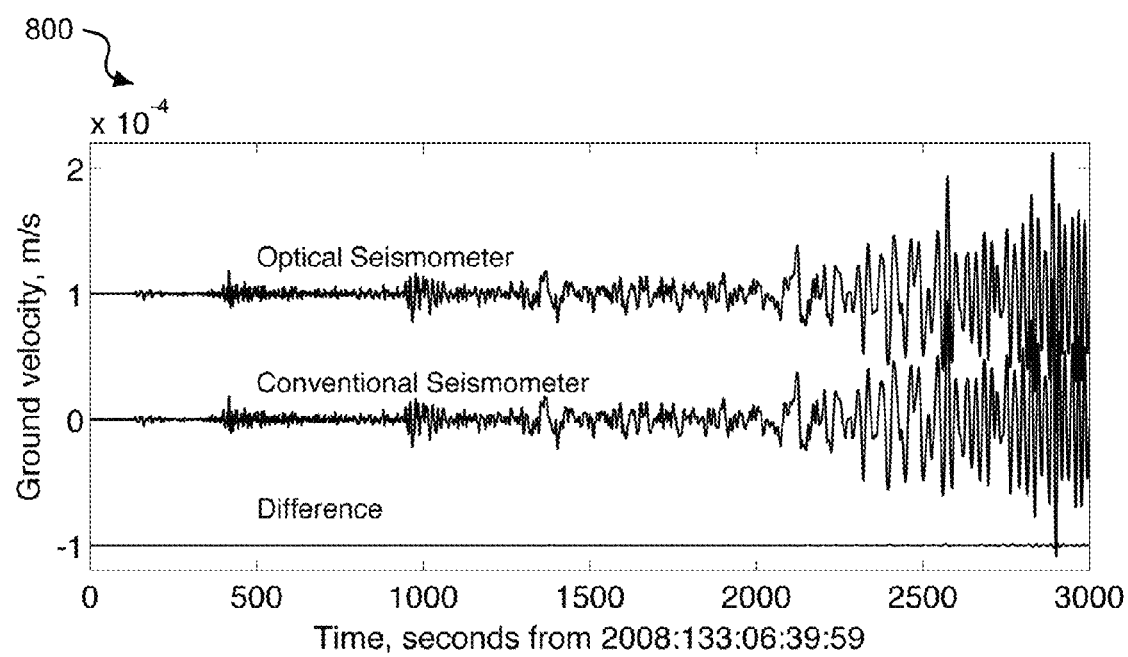
FIG. 8 shows a data plot including seismograms of the 12 May 2008 Sichuan earthquake.

Exemplary implementations were performed that analyzed many seismograms, e.g., by converting the iSTS1 mass position to ground motion using the three exemplary governing parameters and Eq. (5). One example is plotted in FIG. 8, which shows the earliest arriving phases of the 12 May 2008 Sichuan earthquake used in the previous analysis. Also plotted in FIG. 8 is the difference between the records of the iSTS1 and a conventional STS1 at the same location. The ratio of the variance of difference to the variance of the original record is 2×10$^4$.

FIG. 8 shows a data plot 800 including seismograms of the 12 May 2008 Sichuan earthquake. For example, the upper trace represents the conversion of the measured mass motion to ground velocity using Eq. (5) and the parameters determined from the estimated transfer function. The middle trace represents ground motion recorded by a standard STS1 in the adjacent vault. The lower trace represents the residual. For example, the root mean square difference is about 1% of the signal.

Exemplary acceleration power spectra were computed from 16,384 point segments taken from a 10 day record of mass position. The power levels from each frequency interval in the spectra were assembled and the first percentile in each frequency interval is plotted in FIG. 9. Also plotted in FIG. 9 is the minimum power spectrum from a standard STS1 seismometer in a neighboring vault, and the GSN minimum.

Figure 9:
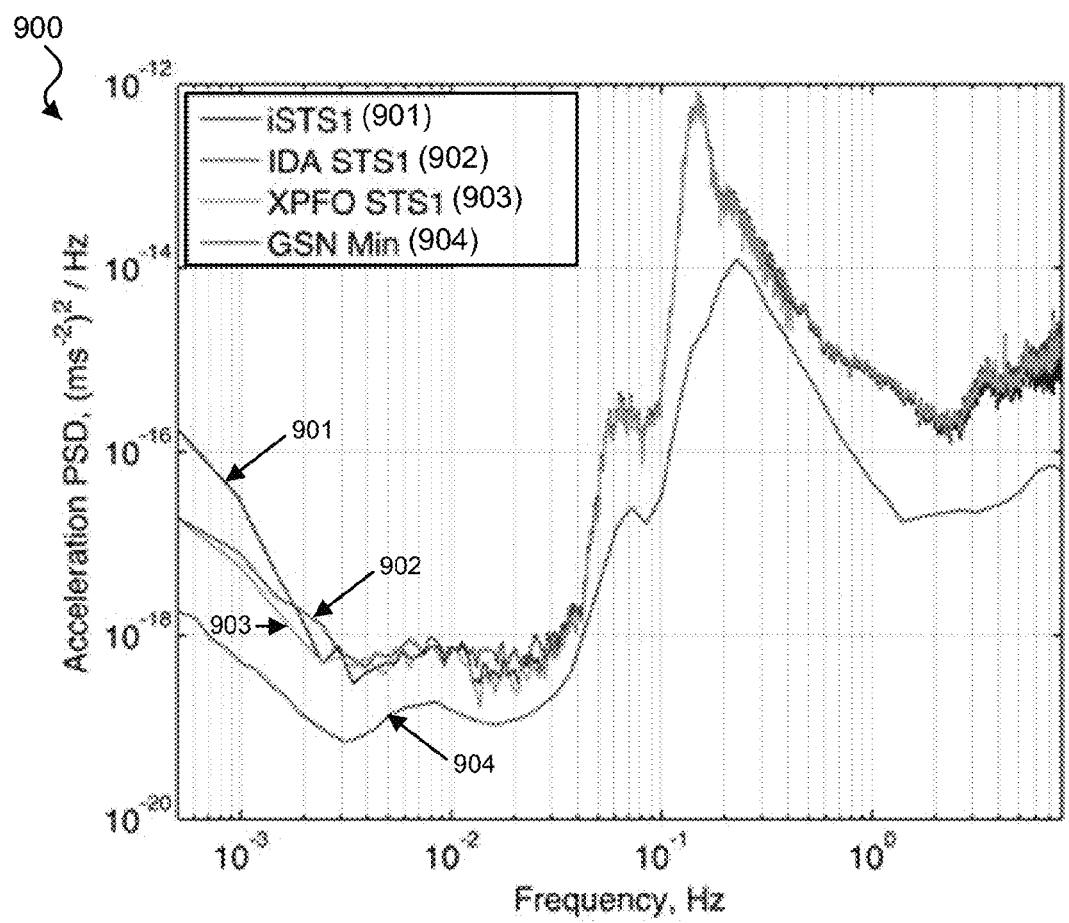
FIG. 9 shows an exemplary data plot of frequency-by-frequency minimum spectral levels.

FIG. 9 shows a data plot 900 of frequency-by-frequency minimum spectral levels (e.g., first percentile) of the iSTS1 (trace 901, blue curve), two exemplary standard STS1 (IDA STS1 represented by trace 902 (red curve) and XPFO STS1 represented by trace 903 (green curve)), and the GSN ensemble (trace 904, dashed curve). For example, the rise in noise at periods longer than 500 sec seen in the iSTS1 may be due to its less favorable thermal environment. For most of the spectrum, the noise level of the iSTS1 is close to that observed by the colocated standard STS1 seismometer. At frequencies lower than about 2 mHz (periods longer than 500 sec), the iSTS1 noise level begins to rise above that observed on the standard STS1, e.g., which may be due to temperature variation inside the vault and differences with the way the iSTS1 and the standard STS1 are mounted on the piers. For example, while the standard STS1 sat on a glass plate over sand, the iSTS1 was mounted on a warpless baseplate with an air gap between the base and pier. The vault at PFO is an underground concrete room buried beneath 3 m of soil. Temperature variations was observed within the insulated enclosure of about 0.002° C. with a semidiurnal period, e.g., which may be caused by outside air leaking into and out of the vault room as the atmospheric pressure fluctuates. The coefficient of thermal displacement for the iSTS1 mass, e.g., observed by varying the ambient temperature by 2.5° C. with a 42 hr square wave, is 35 $\mu m° C.^{-1}$. For example, this value, together with a spectrum of the temperature variations inside the vault, can be converted to equivalent ground acceleration noise, again using Eq. (7). For frequencies where the thermal fluctuations are above the noise floor of the temperature sensor used (RBR model 1050P with resolution of 50 $\mu K$), it was found that the thermal variations are a likely explanation of the noise limit in this exemplary implementation. It is noted, for example, that a seismometer can be operated in a thermally quieter location and in a borehole.

For example, for most teleseismic events, the real ground motion is less than $10^{-4}$ m, and it is unlikely that nonlinearity in a nonfeedback seismometer will be important. In some studies, however, where it is desired, for example, to deduce coseismic deformation from seismograms obtained during large nearby earthquakes, the linearity of the sensor can be important. To evaluate the significance of nonlinearity in the disclosed optical seismometer, an exemplary optical seismometer was placed it on a shake table together with an STS2 seismometer (e.g., used for a reference) and subjected to vertical oscillations ranging in amplitude from, e.g., less than 0.1 mm to a few millimeters at frequencies between 0.002 and 5 Hz. In one set of exemplary implementations, the mass position of the optical seismometer was used to predict the record of the STS2 obtained during a sweep of the driving signal from 0.002 to 5 Hz. For motions of 0.1 mm, no nonlinearity was observed. However, when the table motion was increased to, a 1 mm amplitude, the STS2 velocity predicted from the iSTS1 record differed from the observed STS2 velocity by the order of 1%, e.g., with a character consistent with that caused by an imperfect spring (e.g., the residual was single sided and double the frequency of the test signal). In another set of exemplary implementations, the shake table was excited at an amplitude of 1 mm peak-to-peak with the sum of two closely spaced frequencies adjusted so that the difference frequency was 0.02 Hz. The observed ratio of acceleration at the difference frequency to acceleration at the two excitation frequencies was observed to be a function of the mean excitation frequency; e.g., at 2 Hz it was $10^{-5}$, at 1 Hz it was $10^{-4}$, and at 0.5 Hz it was $4 \times 10^{-4}$. For example, this ratio is zero for a perfectly linear sensor. Exemplary results of the implementations included the reference STS2 showing more nonlinearity at 2 Hz than the optical STS1, e.g., which may be attributed to the STS2 reduced feedback loop gain at higher frequencies, and hence it's reduced ability to electronically maintain its mass's position.

Nonlinearity in a nonfedback seismometer can be modeled and removed. For example, Eq. (2) with higher order terms may be used to linearize all large amplitude signals. For example, while the mechanical stops of the nonfeedback sensor may allow mass motion of nearly 10 mm, the full dynamic range may not be able to be used for some applications, e.g., requiring high linearity. For example, if 1 mm is the maximum acceptable mass excursion, then the maximum range in velocity can be similar to other seismometers except at frequencies in the vicinity of the free period, where the nonfedback seismometer's range is less by 20 dB. This can be improved by increasing the damping, by decreasing the free period, or by numerically linearizing the suspension.

For example, the nonlinear behavior shown from exemplary implementations was found to be negligible, e.g., for mass motions less than 0.1 mm, and it appears at the 1% level (in terms of error in inferred ground velocity) for motions greater than 1 mm. For example, in a year of operating the exemplary optical seismometer during an exemplary implementation, the mass was observed to move more than 0.1 mm on a single occasion, e.g., during the 2008 M6.0 Elko, Nev. earthquake at a range of 1200 km when the mass underwent a maximum displacement of 0.25 mm.

In some implementations, optical fibers can be used for delivery of light to and from the interferometer with little or no degradation of performance. Also, a simple pendulum can be used in horizontal components, and because of the large dynamic range of the disclosed optical displacement transducer, it may not need to be leveled if the borehole is vertical to within a few degrees. Additionally, for example, hysteresis is likely not a problem in the STS1 suspension. An algorithm can be implemented to numerically compensate for nonlinearity where possible.

Various implementations have been described for a seismometer that uses no electronics in the sensor. For example, an optical element can be added to an existing seismometer (e.g., modifying a STS1 vertical seismometer) to monitor its mass position interferometrically. For example, exemplary implementations described included disconnecting electronics in an STS1 and recording the mass position using the described optical displacement transducer. For example, the exemplary optical seismometer demonstrated low noise, broad bandwidth and large dynamic range sufficient to encompass most seismic signals. For example, Earth tides can provide a precise and ever-present calibration signal, e.g., because of the flat response of the exemplary interferometric seismometer to long-period accelerations. For example, long-period noise can be reduced, e.g., by improving the thermal environment.

In another example, a borehole seismometer is described. The exemplary borehole seismometer can provide unique aspects. For example, because the exemplary borehole seismometer moves in a straight line, it can include characteristics that are less impacted by imperfect alignment with the local vertical. Also for example, straight line motion allows better tracking with an optical interferometer. These aspects make the seismometer well suited to borehole installations.

Figure 10:
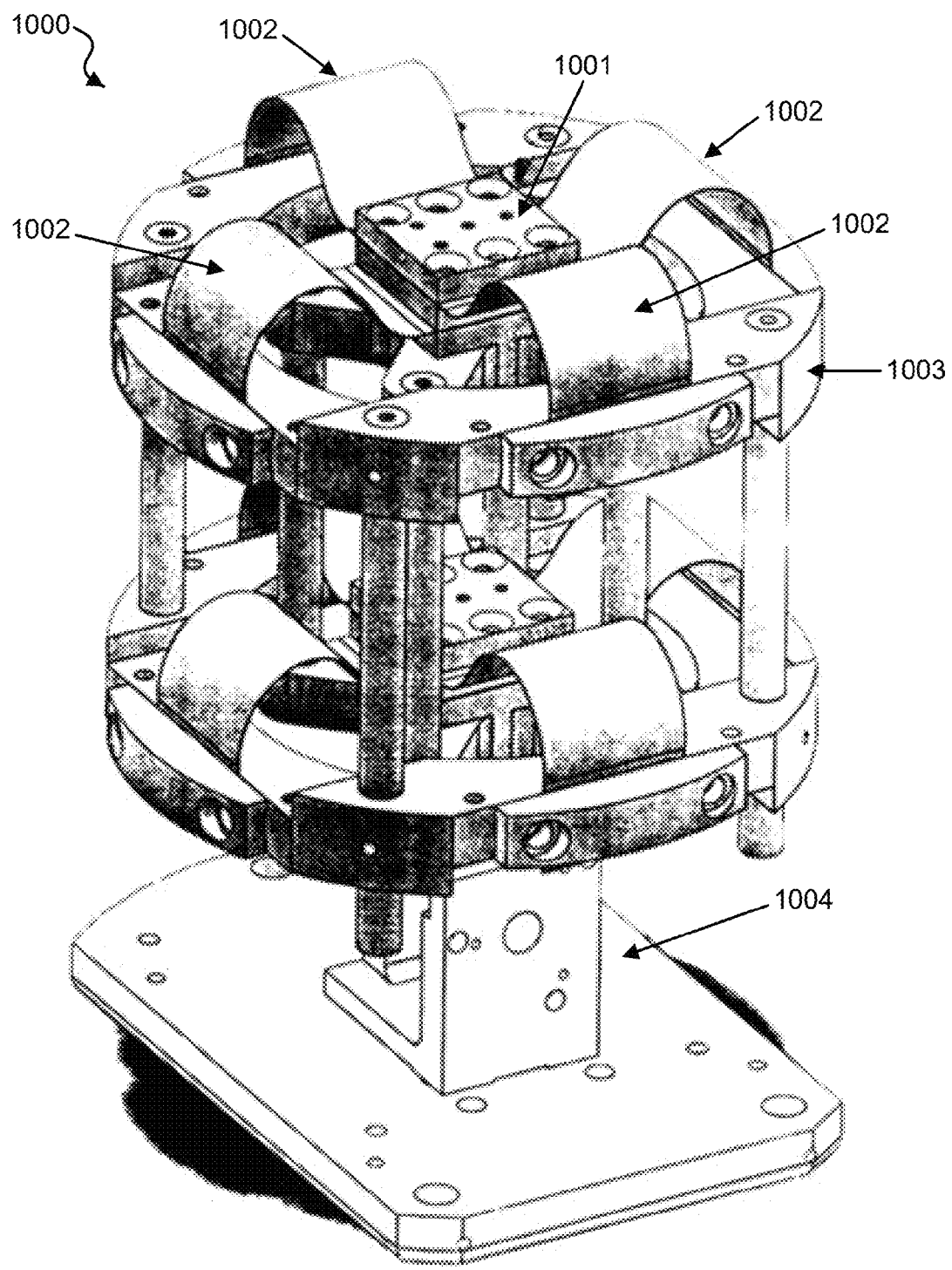
FIG. 10 shows a diagram of an exemplary borehole seismometer.

FIG. 10 shows a diagram of an exemplary borehole seismometer 1000 employing an exemplary optical displacement transducer of the disclosed technology. The exemplary borehole seismometer 1000 can include four leaf springs 1002 on a frame 1003 that supports a spring-mounted pendulum mass 1001 which is free to move vertically. Beneath the pendulum mass 1001 is an optical displacement transducer 1004 that tracks the displacement of the spring-mounted pendulum mass 1001 via a corner-cube retroreflector mounted on the bottom of the mass. For example, the optical displacement transducer 1004 can include the optical displacement transducer described in FIG. 2A. For example, the exemplary light energy source, photodetectors, and processing unit can be located at a substantial distance away from the exemplary borehole seismometer 1000, e.g., outside of an exemplary borehole.

Exemplary methods, processes, and techniques described to determine mass displacement using the disclosed optical seismometer can be performed on systems and devices, e.g., a processing unit. For example, the exemplary processing unit can include a processor that can be in communication with an input/output (I/O) unit, an output unit, and a memory unit. The exemplary processing unit can be implemented as one of various data processing systems, such as a personal computer (PC), laptop, tablet, and mobile communication device. To support various functions of the exemplary processing unit, a processor can be included to interface with and control operations of other components of the processing unit, such as the exemplary I/O unit, the exemplary output unit, and the exemplary memory unit.

To support various functions of the processing unit, the memory unit can store information and data, such as instructions, software, values, images, and other data processed or referenced by the processor. For example, various types of Random Access Memory (RAM) devices, Read Only Memory (ROM) devices, Flash Memory devices, and other suitable storage media can be used to implement storage functions of the memory unit. The exemplary memory unit can store data and information produced by the disclosed optical seismometer. Memory unit can store data and information that can be used to implement an optical seismometer.

To support various functions of the processing unit, the I/O unit can be connected to an external interface, source of data storage, or display device. For example, various types of wired or wireless interfaces compatible with typical data communication standards, e.g., such as Universal Serial Bus (USB), IEEE 1394 (FireWire), Bluetooth, IEEE 802.111, Wireless Local Area Network (WLAN), Wireless Personal Area Network (WPAN), Wireless Wide Area Network (WWAN), WiMAX, IEEE 802.16 (Worldwide Interoperability for Microwave Access (WiMAX)), and parallel interfaces, can be used to implement the I/O unit. The I/O unit can interface with an external interface, source of data storage, or display device to retrieve and transfer data and information that can be processed by the processor, stored in the memory unit, or exhibited on the output unit.

To support various functions of the processing unit, the output unit can be used to exhibit data implemented by the exemplary processing unit. The output unit can include various types of display, speaker, or printing interfaces to implement the exemplary output unit. For example, the output unit can include cathode ray tube (CRT), light emitting diode (LED), or liquid crystal display (LCD) monitor or screen as a visual display to implement the output unit. In other examples, the output unit can include toner, liquid inkjet, solid ink, dye sublimation, inkless (such as thermal or UV) printing apparatuses to implement the output unit; the output unit can include various types of audio signal transducer apparatuses to implement the output unit. The output unit can exhibit data and information, such as imaging, and/or computer system machine information, partially processed data processing information of the disclosed optical seismometer, and completely processed data processing information of the disclosed optical seismometer, among other types and forms of data and information. The output unit can store data and information used to implement an optical seismometer and an optical seismometry process.

Implementations of the subject matter and the functional operations described in this specification, such as various modules, can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Only a few implementations and examples are described and other implementations, enhancements and variations can be made based on what is described and illustrated in this patent document.

What is claimed is:

1. A seismometer based optical sensing, comprising:
a seismometer frame;
a mass of a seismometer suspended to the seismometer frame and responsive to vibrations to move relative to the seismometer frame;
a first optical retroreflector attached to and fixed in position relative to the mass;
a second optical retroreflector attached to and fixed in position relative to the seismometer frame;
optical components including at least one beam splitter and at least one birefringent plate attached to the seismometer frame and configured with the first and second optical retroreflectors to form an optical interferometer;
a first optical detector that detects a first optical output of the optical interferometer;
a second optical detector that detects a second optical output of the optical interferometer;
a first optical path between the optical interferometer and the first optical detector;
a second optical path between the optical interferometer and the second optical detector; and
a processing unit that processes the detector outputs from the first and second optical detectors to extract seismic information indicated by the motion of the mass of the seismometer,
wherein the at least one beam splitter, the first and second optical retroreflectors, and the at least one birefringent plate are operable to alter a light beam to form fringe signals including sine and cosine values of the phase of optical output of the optical interferometer,
wherein the seismometer frame includes a base, a first extension arm attached to the base and extending in a direction away from the base, a second extension arm attached to the base at a separate position with respect to the first extension arm and extending away from the base, and a support arm moveably coupled to the first extension arm at a joint,
wherein the second optical retroreflector and the optical components are attached to the second extension arm,
wherein the mass is attached to the support arm such that it moves with the support arm, and the mass is suspended by a leaf spring, wherein the leaf spring is fixed at one end to the first extension arm of the seismometer frame and engaged at the other end to the support arm so that the mass is suspended by the leaf spring above the base of the seismometer frame, and
wherein the first optical retroreflector is attached to the first extension arm and optically aligned with at least some of the optical components on the second extension arm.

2. The seismometer of claim 1, wherein the optical interferometer is configured to produce two quadrature fringe signals from optical interference of two optical signals of two optical paths.

3. The seismometer of claim 2, wherein the processing unit computes a fractional part for each cycle and tracks a total number of full cycles giving both high resolution and wide dynamic range.

4. The seismometer of claim 1, wherein one of the first and second optical retroreflectors is a corner-cube retroreflector.

5. The seismometer of claim 1, wherein the first optical retroreflector is located above the second optical retroreflector.

6. The seismometer of claim 1, wherein the optical interferometer is configured as a Michelson interferometer.

7. The seismometer of claim 1, wherein the birefringent plate includes a $\lambda/8$ plate.

8. The seismometer of claim 1, wherein the first optical path includes an optical fiber between the optical interferometer and the first optical detector, and the second optical path includes an optical fiber between the optical interferometer and the second optical detector.

9. The seismometer of claim 1, wherein the seismometer is located in a borehole, and at least one of the first optical detector, the second optical detector, or the processing unit are located outside of the borehole.

10. The seismometer of claim 1, wherein the direction that the first extension arm extends away from the base includes a perpendicular direction.

11. A method for measuring seismometry data based on optical sensing, comprising:
transmitting a light beam from a light energy source into two optical paths in an interferometer of an optical seismometer including a mass that is free to move based on seismic movements, wherein the movement of the mass affects at least one of the two optical paths to produce an optical interference signal that indicates the movement of the mass;

using two photodetectors of the optical seismometer to detect two interference fringe signals from the interferometer that represent sine and cosine values of the optical interference in the interferometer; and processing the fringe signals to generate data corresponding to the change in position of the mass, wherein the optical seismometer includes:
- a seismometer frame;
- the mass suspended to the seismometer frame and responsive to vibrations to move relative to the seismometer frame;
- a first optical retroreflector attached to and fixed in position relative to the mass;
- a second optical retroreflector attached to and fixed in position relative to the seismometer frame;
- optical components including at least one beam splitter and at least one birefringent plate attached to the seismometer frame and configured with the first and second optical retroreflectors to form the interferometer;
- a first photodetector that detects a first optical output of the interferometer;
- a second photodetector that detects a second optical output of the interferometer;
- a first optical path between the interferometer and the first optical detector;
- a second optical path between the interferometer and the second optical detector; and
- a processing unit that processes the detector outputs from the first and second optical detectors to extract seismic information indicated by the motion of the mass of the seismometer, wherein the at least one beam splitter, the first and second optical retroreflectors, and the at least one birefringent plate are operable to alter a light beam to form fringe signals including sine and cosine values of the phase of optical output of the interferometer, wherein the seismometer frame includes a base, a first extension arm attached to the base and extending in a direction away from the base, a second extension arm attached to the base at a separate position with respect to the first extension arm and extending away from the base, and a support arm moveably coupled to the first extension arm at a joint, wherein the second optical retroreflector and the optical components are attached to the second extension arm, wherein the mass is attached to the support arm such that it moves with the support arm, and the mass is suspended by a leaf spring, wherein the leaf spring is fixed at one end to the first extension arm of the seismometer frame and engaged at the other end to the support arm so that the mass is suspended by the leaf spring above the base of the seismometer frame, and wherein the first optical retroreflector is attached to the first extension arm and optically aligned with at least some of the optical components on the second extension arm.

12. The method of claim 11, comprising placing the seismometer in a borehole.

13. The method of claim 12, wherein the borehole is located in a range of a hundred to thousands of feet below the ground surface.

14. The method of claim 12, wherein the borehole exposes the seismometer to at least one of temperatures exceeding 100° C., noxious gases, or caustic liquids.

* * * * *